US005477954A

United States Patent [19]

Greutter et al.

[11] Patent Number: 5,477,954

[45] Date of Patent: Dec. 26, 1995

[54] HANDRAIL TURN AROUND FOR ESCALATORS AND MOVING WALKS

[75] Inventors: Wilfried Greutter, Vienna; Gerhard Kleewein, Pressbaum; Dietrich Kuen, Neufeld, all of Austria

[73] Assignee: Inventio AG, Hergiswil NW, Switzerland

[21] Appl. No.: 378,669

[22] Filed: Jan. 26, 1995

[30] Foreign Application Priority Data

Feb. 16, 1994 [CH] Switzerland .............................. 462/94

[51] Int. Cl.$^6$ .................................................... B65G 15/00

[52] U.S. Cl. ............................................................ 198/335

[58] Field of Search ...................................... 198/335, 337

[56] References Cited

U.S. PATENT DOCUMENTS

| | | | |
|---|---|---|---|
| 3,623,589 | 11/1971 | Johnson | 198/335 |
| 5,181,595 | 1/1993 | Tietze et al. | 198/335 |

FOREIGN PATENT DOCUMENTS

| | | | |
|---|---|---|---|
| 0140391 | 10/1979 | Japan | 198/335 |
| 0140383 | 10/1979 | Japan | 198/335 |
| 4308182 | 10/1992 | Japan | 198/335 |
| 0165990 | 1/1981 | Netherlands | 198/335 |
| 484824 | 3/1970 | Switzerland . | |
| 2006706 | 5/1979 | United Kingdom | 198/335 |

*Primary Examiner*—James R. Bidwell
*Attorney, Agent, or Firm*—Sandler, Greenblum & Bernstein

[57] ABSTRACT

Handrail turn around for escalators and moving walks. In this handrail turn around, rolling element bearings, press fitted on axle bolts can be assembled more economically in that lateral flanges of the reversing band are stamped so as to form nearly semicircular cutouts into which the axle bolts, with their press fitted rolling element bearings, can be snapped, with the cutouts having a narrow portion that is narrower than the diameter of the associated axle bolts, with a central flange on the axle bolt serving as an abutment for the rolling element bearings wherein each two of the opposed bent flanges are preloaded so that the axle bolts can readily be clamped, whereinafter after the insertion of the axle bolts, the reversing band is bent into its operative shape, with the handrail guide section also serving as a cover for the handrail turn around.

2 Claims, 2 Drawing Sheets

HANDRAIL TURN AROUND FOR ESCALATORS AND MOVING WALKS

CROSS REFERENCE TO RELATED APPLICATIONS

This application claims the priority of Swiss Patent Application No. 00 462/94-7, filed Feb. 16, 1994, the disclosure of which is incorporated herein by reference in its entirety.

BACKGROUND OF THE INVENTION

1. Field of the Invention

This invention pertains to a turn around or return for escalators or moving walks, which utilize a handrail band guided over a balustrade via rolling element bearings.

2. Discussion of the Background of the Invention and Material Information

In escalators, the handrail is turned around or reversed, in the escalator end regions, via rolling element bearings attached at the balustrade in order to maintain an even tension in the handrail and to not increase the wear of the rubber, that is not to increase the temperature of the handrail and to ensure the operational smoothness or easy running of the handrail.

Prior art Swiss Patent No. CH-PS 484 824 discloses a handrail turn around guide which fulfills the previously noted requirements. The handrail turn around guide is comprised of a plurality of rollers, subsequently arranged in the direction of movement of the handrail, which are releasably connected with each other in a chain type manner via side bars, with the rollers serving to support the handrail. The axle bolts utilized for journalling the rollers and the side bars or splice members, utilized for connecting the rollers, are joined by releasable expander rivets.

The disadvantage of the previously described handrail turn around guide resides therein that for the exchange or removal of the rollers, the side bars and the expander rivets, must be removed, which in turn leads to relatively long assembly times. In addition, the chain type band separates into two parts, upon the removal of a roller, which additionally complicates the assembly.

SUMMARY OF THE INVENTION

It is the task or object of this invention, to produce a handrail turn around of the previously described type which does not include the noted disadvantages and via which the rollers and the rolling element bearings can be assembled more quickly and more economically.

This task or object is achieved via the features set forth in the claims, wherein the rolling element bearings, assembled onto the axle bolts, are snapped into recesses of the sheet metal band, which in turn is secured to the balustrade, and retained via a clamping action.

One embodiment of this invention pertains to a handrail turn around for one of escalators and moving walks, having a handrail band guided over a balustrade, the handrail turn around including a reversing band and a plurality of subsequently arranged rolling element bearings and axle bolts, with the handrail rolling band rolling over the rolling element bearings, with the reversing band including means for the reception of the axle bolts, with the axle bolts in turn having the rolling element bearings press fitted thereon.

In another embodiment of the handrail turn around of this invention, the reception means for the axle bolts take the form of lateral flanges attached to the reversing band, with the lateral flanges including portions defining approximately semicircular cutouts, the portions in turn having a narrow entrance section that is narrower than the diameter of the associated axle bolts.

In a further embodiment of the handrail turn around of this invention, the two laterally opposed and angularly bent lateral flanges of the reversing band, in pairs, exert an axial clamping action on the axle bolts.

In yet another embodiment of the handrail turn around of this invention, the axle bolts are formed from circular steel rods and include a central collar, with the collar serving as an abutment for the rolling element bearings.

In a variation of the previous embodiment, the central collar takes the form of a spacer ring that is adapted to be slid upon the axle bolt.

The advantage achieved by this invention can essentially be ascertained in that the rolling element bearings, press fitted onto the axle bolts, are merely pressed or snapped into the recesses of the sheet metal band thus resulting in an economical assembly. In order to exchange or replace the rolling element bearings, no additional retaining elements need to be loosened since the axle bolts merely need to be snapped from the recesses. The rigidly connected turn around or reversing band, upon the insertion or addition of the axle bolts, is bent or formed into its operating shape, which in turn simplifies the assembly. In order to ensure secure retention of the axle bolts, during all instances, the lateral flanges provide a clamping action relative to or against the axle bolts.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
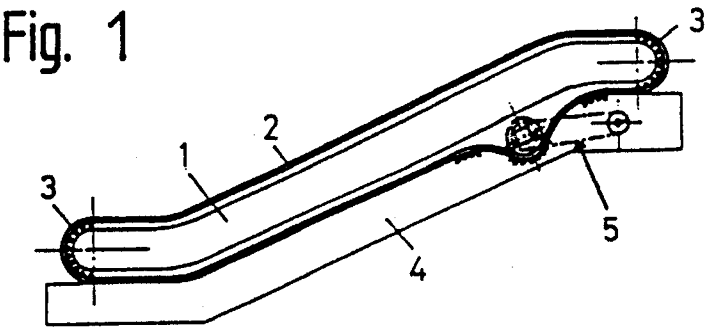
FIG. 1 is a schematic representation, in a side view, of an escalator, showing the balustrade, handrail and drive system.

In FIG. 1, numeral 1 denominates a balustrade of an escalator, with numeral 2 denominating a flexible, elastic handrail band. Handrail band 2 is guided at the upper and lower ends of the escalator by means of a handrail turn around or return 3. The support base or foundation 4 of the escalator houses a drive system for handrail band 2 and consists principally of a drive motor and transmission components which will not be described in further detail hereinafter.

Figure 2:
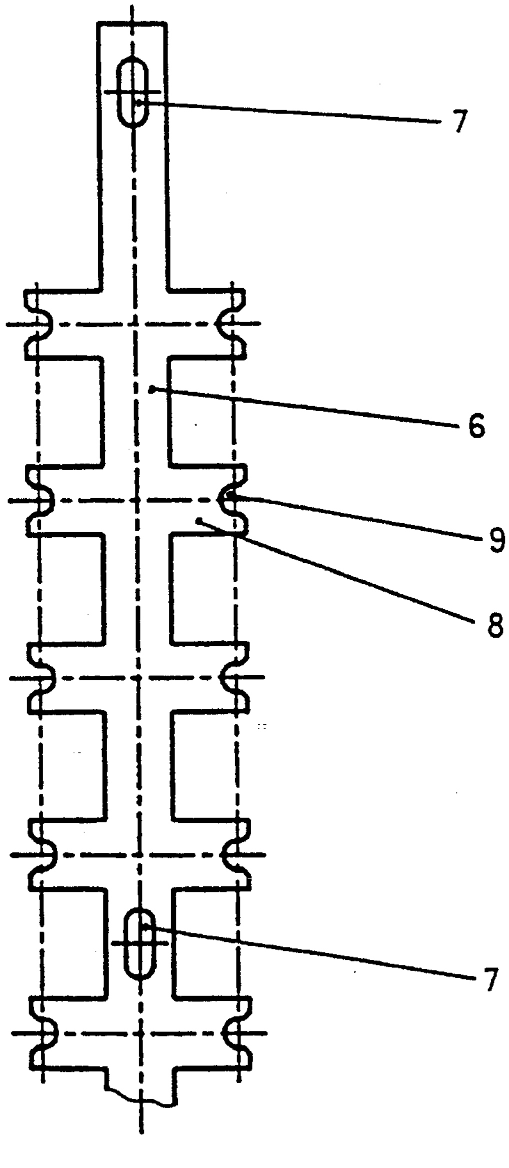
FIG. 2 is a portion of a top plan view of the reversing band prior to forming.

In FIG. 2, numeral 6 denominates a turn around or reversing band that is preferably stamped from sheet steel. Turn around band 6 is attached, via screw attachments, through attachment apertures 7, onto the rounded end regions of balustrade 1. A slightly greater than semicircular clearance or cutout 9, stamped into lateral flanges 8, serves for the reception of circular axle bolts 10 shown in FIG. 3. After the noted stamping, lateral flanges 8 are each bent or formed slightly more than 90°.

Figure 3:
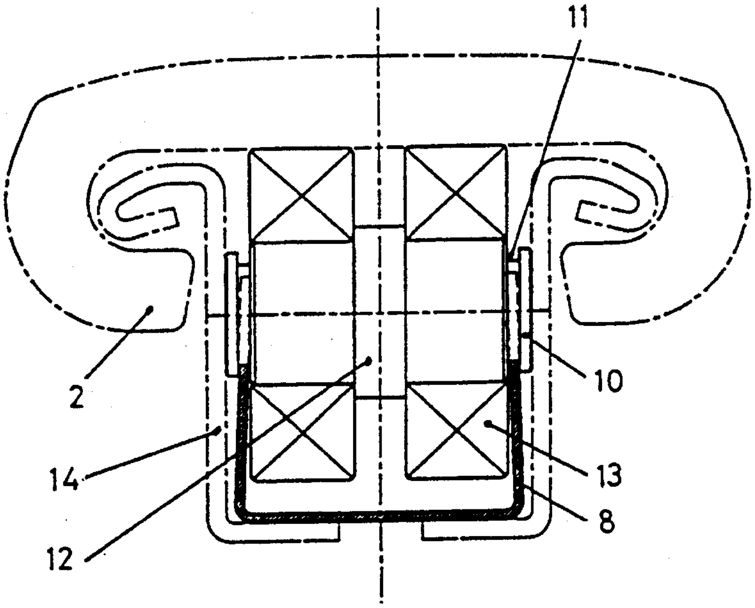
FIG. 3 is an enlarged sectional view through the turn around having snapped on axle bolts.

As shown in FIG. 3, lateral flanges 8, with reference to axle bolts 10, are so preloaded or pretensioned that axle bolts 10 are clamped in the axial direction. This can be accomplished through an appropriate bending or forming of lateral flanges 8, prior to the assembly of axle bolts 10, over slightly more than 90°, or after a subsequent crossing or folding of lateral flanges 8. Each axle bolt 10 includes an annular groove 11 on each of its ends. Recess or cutout 9 is, at its narrowest point, slightly smaller than the diameter of annular groove 11. A central axial collar 12 serves as an abutment for rolling element bearings 13, such as ball bearings, with bearings 13, press fitted upon axle bolts 10, supporting handrail band 2 and ensuring the latter's easy running or smoothness of operation. Handrail guide section or profile piece 14 has the function of guiding handrail band 2 and to outwardly cover handrail turn around 3.

Figure 4:
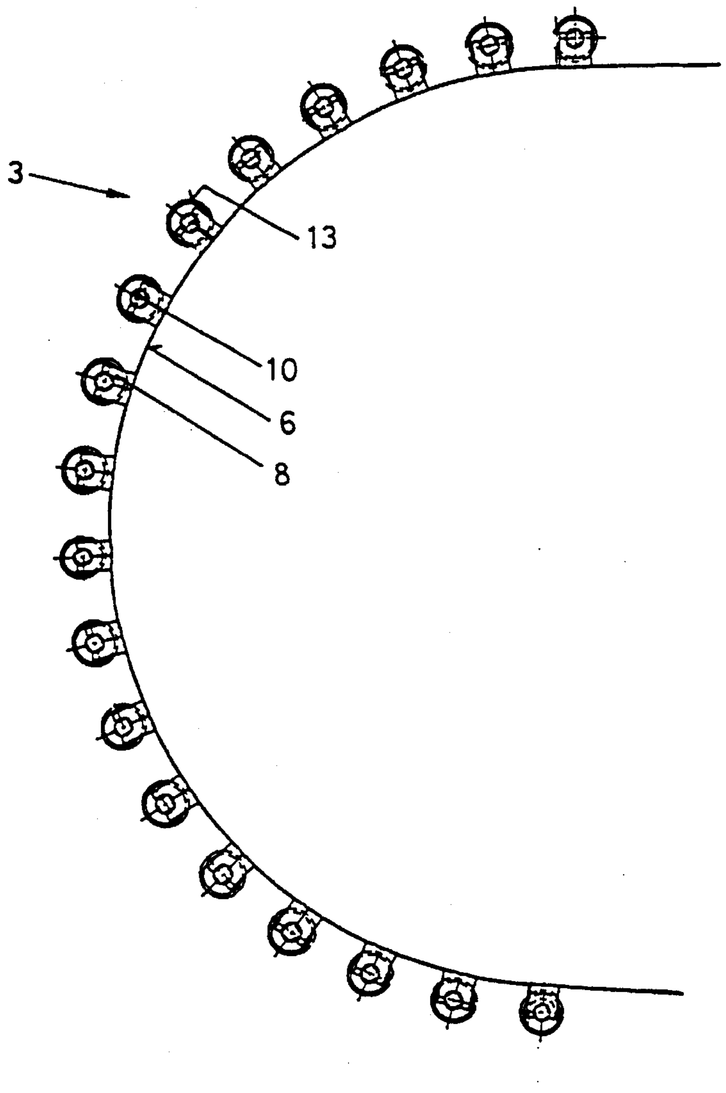
FIG. 4 is a side view of the turn around with snapped on axle bolts.

FIG. 4 shows handrail turn around 3 with bent or formed turn around or reversing band 6. Axle bolts 10, having rolling element bearings 13 press fitted thereon, are snapped between lateral flanges 8. This invention greatly simplifies the assembly or mounting of rolling element bearings 13. It requires very little effort or force to press axle bolts 10 into reversing band 6. For the exchange of defective or damaged rolling element bearings, they are merely pulled out and replaced with new ones. No retention elements need to be loosened or replaced.

It is also feasible to delete annular grooves 11 on each end of axle bolt 10, since a displacement of axle bolts 10 is prevented by handrail guide section 14 and since lateral flanges 8 can directly abut against the inner ring of rolling element bearings 13. In this embodiment, axle bolts 10 can be comprised of a circular steel rod that needs no further machining. Clearance or cutout 9 of lateral flanges 8, at its narrowest point, is slightly smaller than the diameter of axle bolt 10. In addition, a spacer ring, slid upon axle bolt 10 can be utilized as a central collar. In view of the two noted adaptions or modifications, the production of axle bolts 10 is greatly simplified.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A handrail turn around for one of escalators and moving walks, having a handrail band guided over a balustrade, the handrail turn around including a reversing band and a plurality of subsequently arranged rolling element bearings and axle bolts, with the handrail band rolling over the rolling element bearings, with the reversing band including a reception mechanism for the axle bolts, with the axle bolts in turn having the rolling element bearings press fitted thereon, and the reception mechanism of the axle bolts comprising two laterally opposed and angularly bent lateral flanges of the reversing band, with the flanges, in pairs, exerting an axial clamping action on the axle bolts.

2. The handrail turn around of claim 1, wherein the lateral flanges include portions defining approximately semicircular cutouts, the portions in turn having a narrow entrance section that is narrower than the diameter of the associated axle bolts.

* * * * *